US012704157B2

(12) United States Patent
Yao et al.

(10) Patent No.: US 12,704,157 B2
(45) Date of Patent: Aug. 11, 2026

(54) STRUCTURE OF ONE-WAY BEARING

(71) Applicant: Li-Ho Yao, Taipei City (TW)

(72) Inventors: Li-Ho Yao, Taipei City (TW); Pei-Sheng Hsieh, Taipei City (TW); Pi-Jen Hsieh, Taipei City (TW); Wei-Tsung Chen, Taipei City (TW)

(73) Assignee: Li-Ho Yao, Taipei City (TW)

( * ) Notice: Subject to any disclaimer, the term of this patent is extended or adjusted under 35 U.S.C. 154(b) by 0 days.

(21) Appl. No.: 19/001,578

(22) Filed: Dec. 26, 2024

(65) Prior Publication Data

US 2025/0215938 A1 Jul. 3, 2025

(30) Foreign Application Priority Data

Jan. 2, 2024 (TW) ................................ 113100105

(51) Int. Cl.
*F16D 41/067* (2006.01)
*F16D 41/06* (2006.01)

(52) U.S. Cl.
CPC .... *F16D 41/067* (2013.01); *F16D 2041/0605* (2013.01)

(58) Field of Classification Search
CPC ........... F16D 41/067; F16D 2041/0605; F16D 41/088; F16D 2041/0608; F16D 41/066; F16C 2208/20; F16C 2220/04; F16C 2226/70; F16C 19/46; F16C 33/4605; F16C 33/4635; F16C 33/498; F16C 19/26; F16C 41/001
See application file for complete search history.

(56) References Cited

U.S. PATENT DOCUMENTS 4,986,140 A * 1/1991 Morishita ............. F16D 41/066 74/7 A
5,117,954 A * 6/1992 Iga ........................ F16D 41/067 192/42
5,119,919 A * 6/1992 Iga ........................ F02N 15/023 192/45.012
7,143,881 B2 * 12/2006 Ichihara ................ F16D 41/067 192/104 C
2003/0085091 A1 * 5/2003 Ichihara ................ F16D 41/067 192/45.006

(Continued)

*Primary Examiner* — Farhana Pervin
(74) *Attorney, Agent, or Firm* — Leong C. Lei

(57) ABSTRACT

A one-way bearing is arranged between an input member and an output member and includes a plastic mounting base, a plurality of rollers, and a metallic transmission base. The plastic mounting base is molded to form a plurality of equidistant and radially-penetrating mounting recesses, and the rollers are respectively received in the mounting recesses. A circumferential surface of the metallic transmission base that corresponds to the plastic mounting base is formed with a plurality of transmission slopes respectively corresponding to the mounting recesses, so that the rollers arranged in the plastic mounting base may selectively clamp the metallic transmission base by means of the transmission slope to induce an effect of one-way driving. In this way, the molded plastic mounting base may help reduce the weight of the one-way bearing without affecting the strength for power transmission, achieving advantages of light weight, cost reduction, and easy machinability.

4 Claims, 6 Drawing Sheets

(56) References Cited

U.S. PATENT DOCUMENTS

2005/0092574 A1* 5/2005 Tanaka .................. F16D 41/067 192/45.015
2008/0078647 A1* 4/2008 Watanabe ............. F16D 41/064 192/41 A
2008/0236977 A1* 10/2008 Akiyoshi .............. F16D 41/067 192/45.019
2013/0283949 A1* 10/2013 Fujiwara ............ F16C 33/4664 74/405
2016/0348728 A1* 12/2016 Chen ..................... F16C 19/463
2017/0037913 A1* 2/2017 Fujiwara ............... F16D 41/067
2019/0211891 A1* 7/2019 Reimchen ............. F16D 41/067
2021/0062863 A1* 3/2021 Kim ...................... F16C 29/002

* cited by examiner

STRUCTURE OF ONE-WAY BEARING

BACKGROUND OF THE INVENTION

(a) Technical Field of the Invention

The present invention relates to the technical field of bearings, and more particularly to a lightweight structure of one-way bearing that can effectively reduce the weight of the one-way bearing without affecting the strength for power transmission and further has the effect of easy machinability and reduction of manufacturing costs.

(b) Description of the Prior Art

A prior art one-way bearing is shown in FIGS. 1 and 2, and the one-way bearing 10 is arranged between an input member 20 and an output member 30 so as to utilize the one-way bearing 10 to allow the input member 20 to selectively drive the output member 30 in a one-way manner, wherein the one-way bearing 10 comprises a transmission ring 11, and a circumference of the transmission ring 11 that corresponds to the input member 20 is formed with a plurality of equidistant receptacles 12. Two ends of an inside bottom surface of each or the receptacles 12 is respectively formed with a shallow trough portion 121 and a deep trough portion 122, and a roller 15 is disposed in the receptacle 12, and further, the receptacle 12 is provided with an elastic element 16 therein between the roller 15 and the deep trough portion 122 corresponding thereto, so as to bring the rollers 15 in the quickest way toward the shallow trough portion 121 for clamping and inducing one-way driving. An outer circumference of the transmission ring 11 is formed with a plurality of equidistant semi-circular pin notches 18, which mate with a plurality of positioning pins 19 to fulfill an effect of constraining the output member 30.

The known one-way bearing 10 described above is a one-piece structure. To prevent undesired influence on the resistance for transmission, it needs to machine the transmission ring 11 for assembling the rollers 15 therewith, and it is also necessary that the rollers 15 be in direct contact with the input member 20 to generate a transmission force toward the output member 30. As such, in order to enhance the strength of the transmission ring 11 of the one-way bearing 10 for bearing the resistance and to prevent fracturing and breaking, it is necessary to increase the thickness of the transmission ring 11. This inevitably increases the overall weight and the difficulty of machining, making it contrary to the trend of lightweight designs. Further, the one-way bearing 10 uses the semi-circular pin notches 18 and the positioning pins 19, which are generally small in diameter, to generate the effect of constraining to the output member 30, and this makes it hard to persistently bear the output force for transmission. Long term operation may result in fracture of the positioning pins 19 or breaking of the transmission ring 11, and thus affecting the life span thereof.

In other words, the existing one-way bearing is imperfect with respect to the structural design thereof and suffers problems of being not easy to reduce the weight and insufficiency of bearing force. Thus, further improvement is necessary. To solve such problems is what the present invention aims for.

SUMMARY OF THE INVENTION

Therefore, the primary objective of the present invention is to reduce the weight through change of material and to increase the area of resistance strength so as to be not easily fractured or broken and effectively extend the life span.

Further, the secondary objective of the present invention is to effectively achieve the purposes of being light weight and having a small occupation area, without affecting the strength for power transmission, so as to achieve the purposes of easy machinability and reduction of cost.

DETAILED DESCRIPTION OF THE PREFERRED EMBODIMENTS

Figure 1:
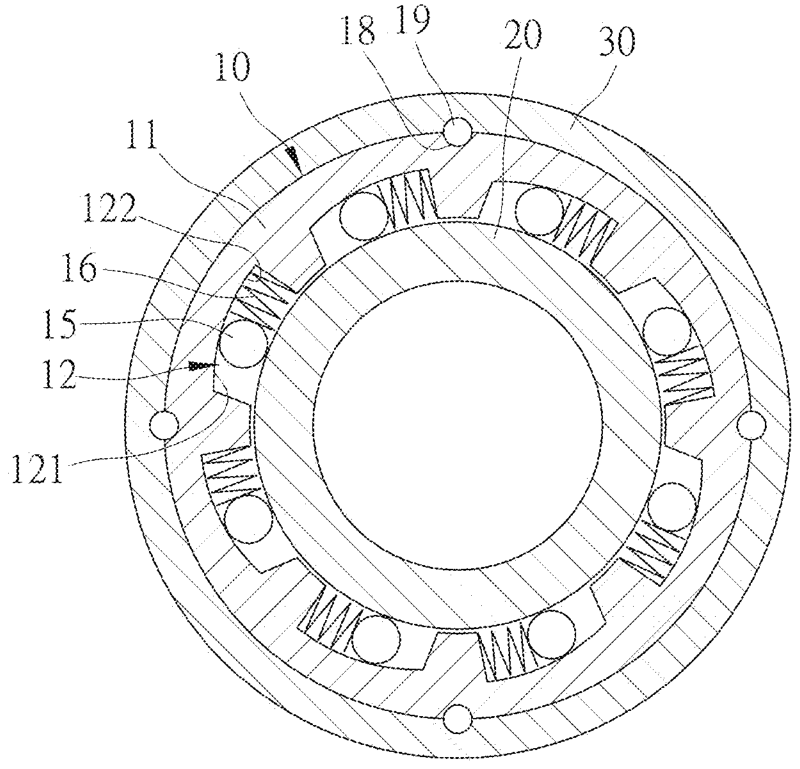
FIG. 1 is a cross-sectional view of a prior art one-way bearing.
Figure 2:
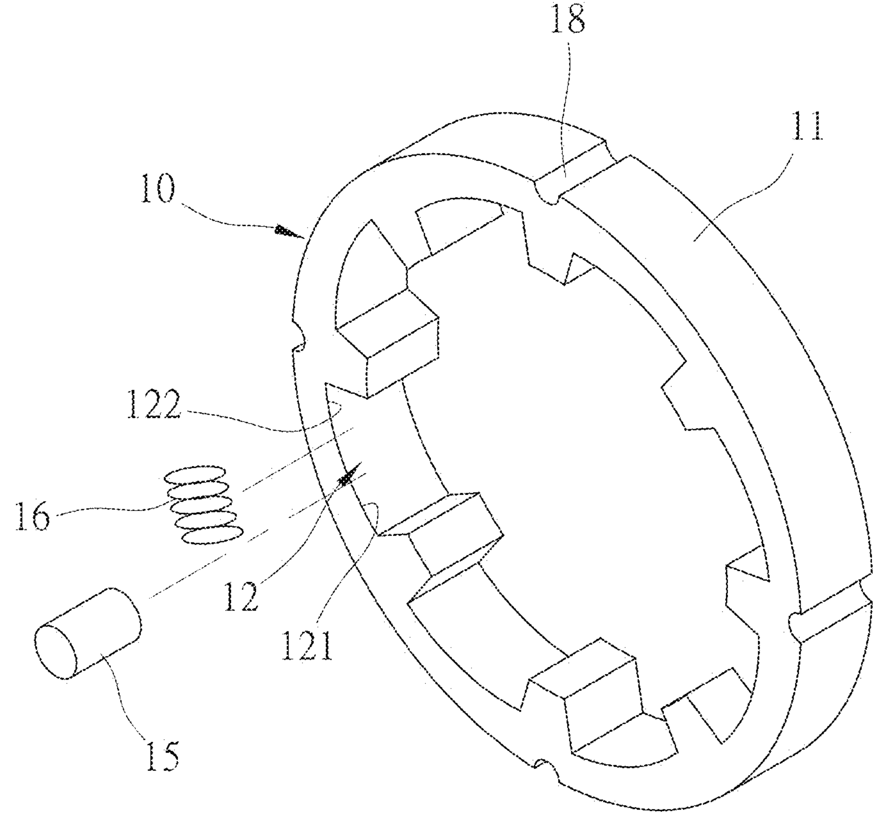
FIG. 2 is an exploded view of the prior art one-way bearing.
Figure 3:
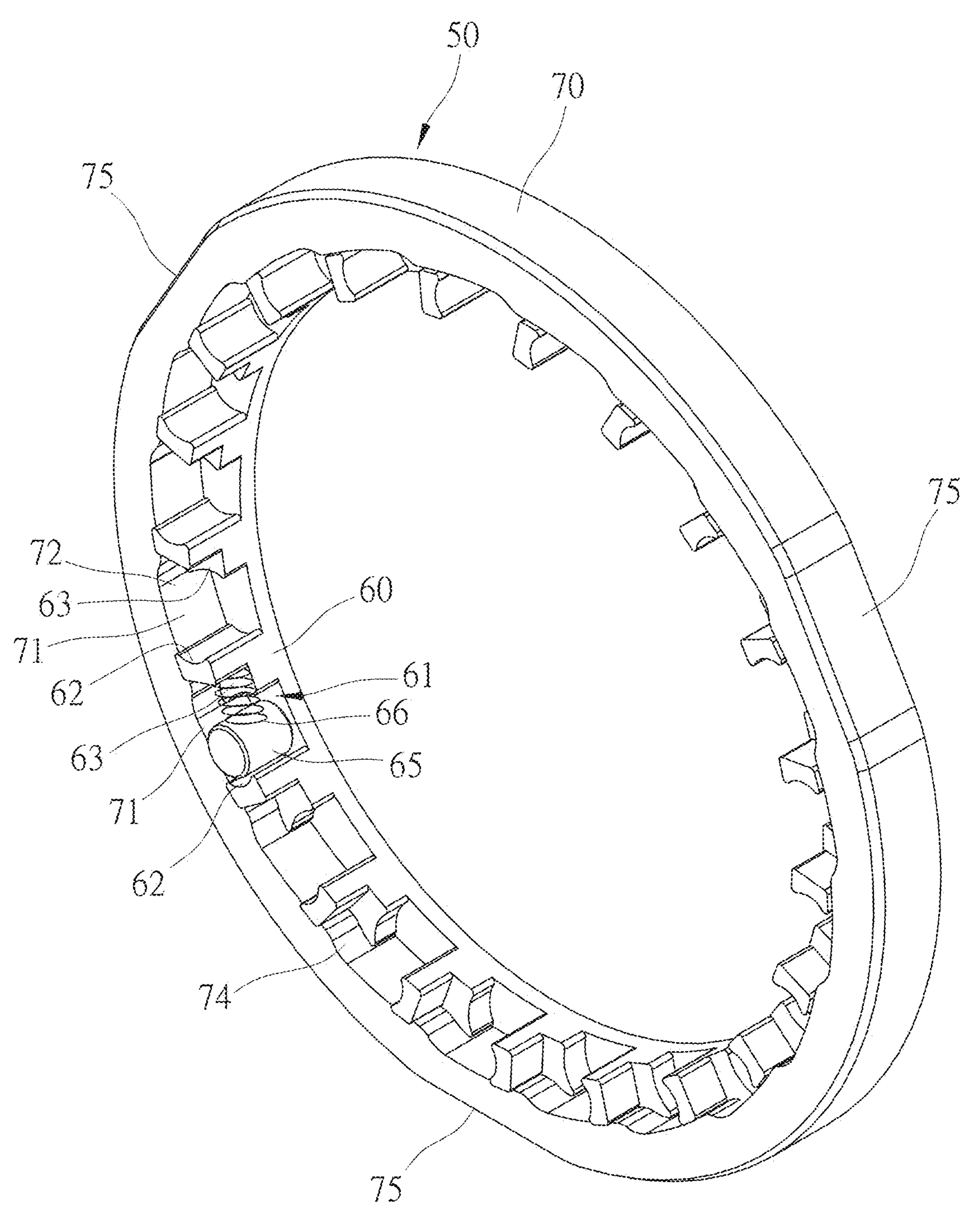
FIG. 3 is a perspective view of the present invention.
Figure 4:
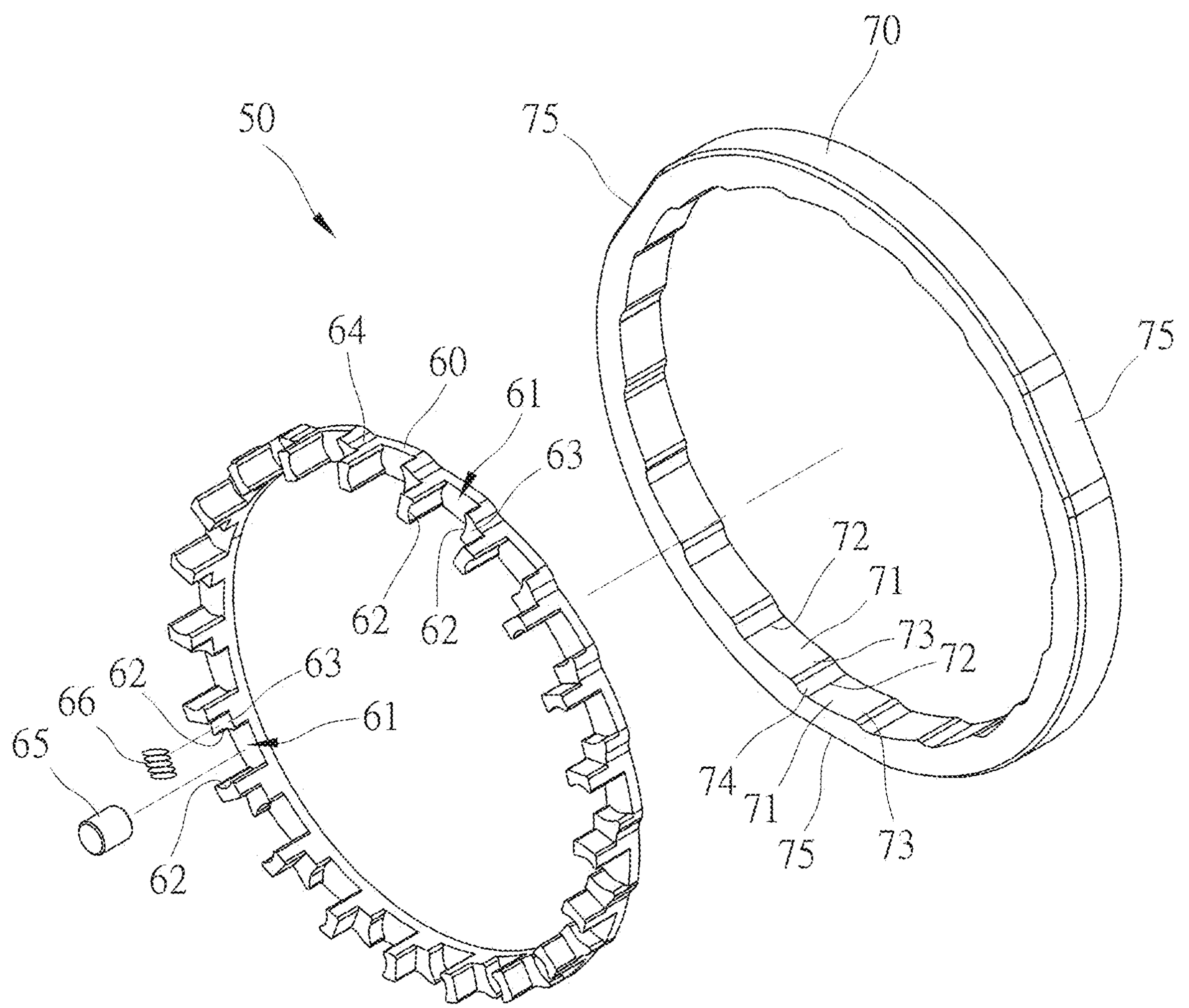
FIG. 4 is an exploded view of the present invention.
Figure 5:
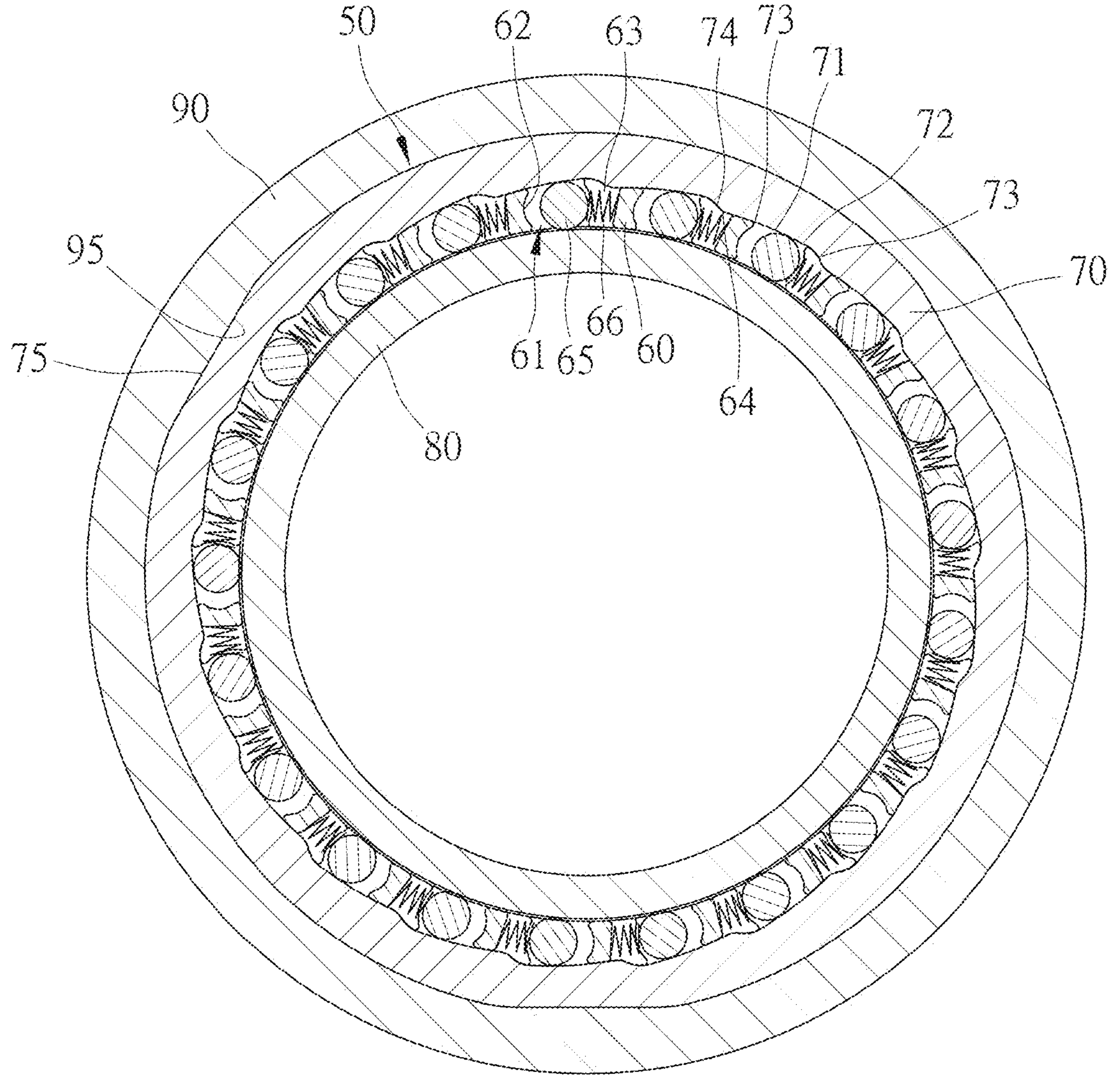
FIG. 5 is a cross-sectional view of the present invention.

As shown in FIGS. 3, 4, and 5, the present invention provides a one-way bearing 50 that is applicable between an input member 80 and an output member 90. The one-way bearing 50 comprises a plastic mounting base 60, a plurality of rollers 65, and a metallic transmission base 70 and allows the input member 80 to selectively drive the output member 90 to move toward a driving side in a one-way manner.

A detailed structure of the one-way bearing 50 may refer to FIGS. 3, 4, and 5, wherein the plastic mounting base 60 is made through injection molding of plastics, and the plastic mounting base 60 comprises a plurality of equidistant radially-penetrating mounting recesses 61. The mounting recesses 61 respectively receive the rollers 65 to dispose therein. The mounting recesses 61 each have two opposite inside surfaces each of which forms a concave arc surface 62 corresponding to a circumference of the rollers 65 to increase an operation space for the rollers 65. One inside surface of the two opposite inside surfaces of each of the mounting recesses 61 that corresponds to a non-clamping-operation side of the respective roller 65 is formed with a stepped notch 63, which receives therein an elastic element 66 that biasingly pushes an outer circumference of the roller 65. Further, one side of the two opposite inside surfaces of the mounting recesses 61 of the plastic mounting base 60 that corresponds to the metallic transmission base 70 is formed with a first retention curved surface 64 for combining and positioning the plastic mounting base 60 and the metallic transmission base 70. The input member 80 is arranged at one side of the plastic mounting base 60 that is opposite to the metallic transmission base 70, so that the input member 80 is settable in contact with and thus driving the rollers 65 received in the plastic mounting base 60 for operation.

Figure 6:
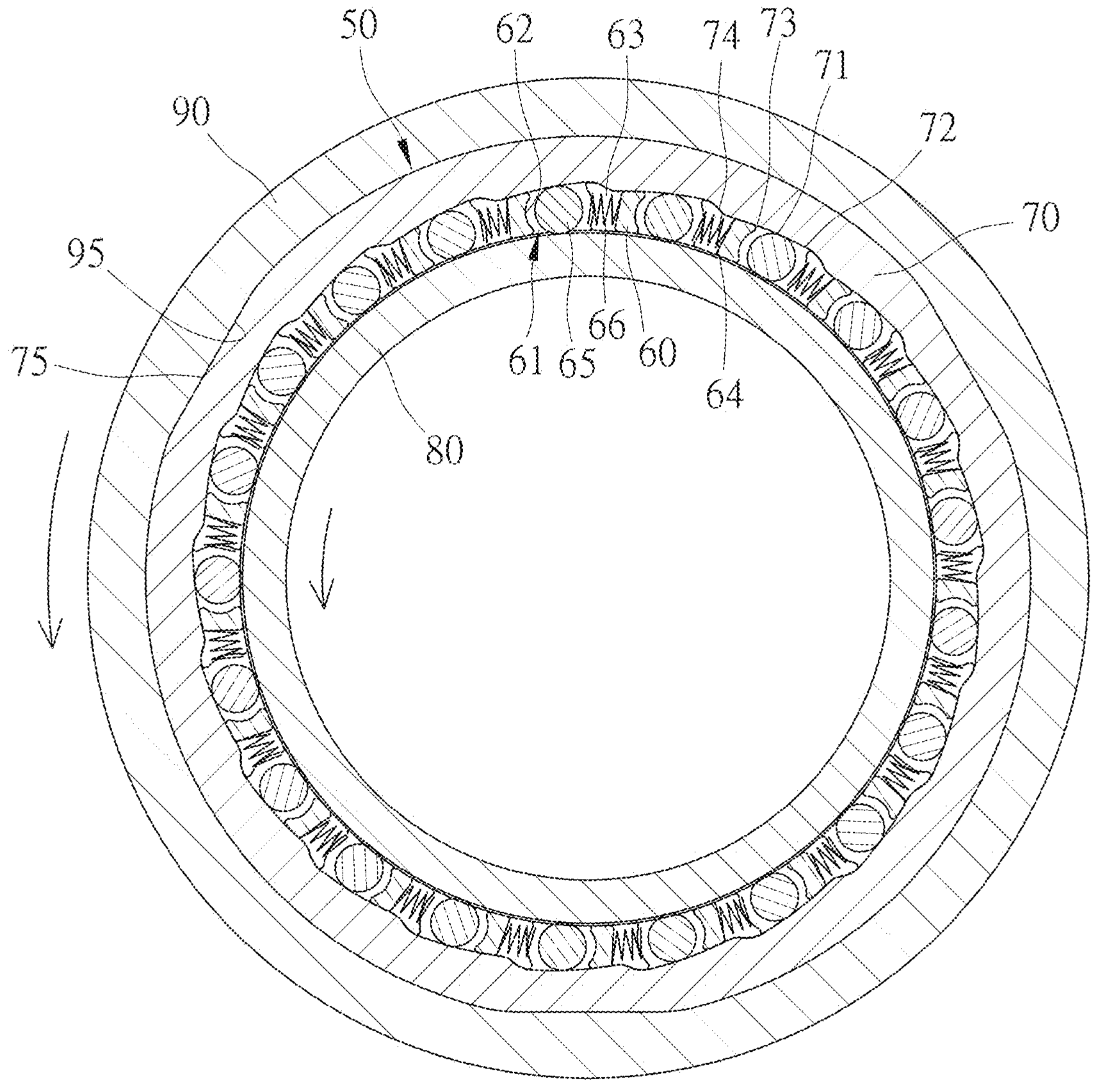
FIG. 6 is a cross-sectional view of the present invention that is put in operation.

The metallic transmission base 70 is made of a metal material that possesses resistance. The metallic transmission base 70 is arrangeable on the inner circumference or the outer circumference of the plastic mounting base 60, and the metallic transmission base 70 being arranged at the outer circumference of the plastic mounting base 60, with the input member 80 being arranged at the inner circumference of the plastic mounting base 60, is adopted as a primary embodiment of the present invention. A surface of the metallic transmission base 70 that corresponds to the plastic mounting base 60 is formed, along a circumference thereof, with a plurality of transmission slopes 71 to respectively correspond to the mounting recesses 61, and as shown in FIG. 5, each of the transmission slopes 71 has two ends, of which one corresponding to a non-driving side is formed with a deep trough portion 72, while one end that corresponds to a driving side is formed with a shallow trough portion 73, so that when operation of the input member 80 causes the rollers 65 to move to the shallow trough portions 73 of the transmission slope 71, an effect of tightly clamping and driving may be induced (as shown in FIG. 6). Oppositely, when operation of the input member 80 causes the rollers 65 to move to the deep trough portions 72 of the transmission slope 71, an effect of free rotation may be induced (as shown in FIG. 5). Between the shallow trough portion 73 and the deep trough portion 72 of adjacent transmission slopes 71 of the metallic transmission base 70, a second retention curved surface 74 is formed to correspond to the first retention curved surface 64 of the plastic mounting base 60 for combining and retaining the metallic transmission base 70 and the plastic mounting base 60 in position with respect to each other. A circumference of the metallic transmission base 70 that corresponds to the output member 90 is formed with at least one first retaining engagement surface 75, and a corresponding circumference of the output member 90 is formed with a second retaining engagement surface 95 corresponding to the first retaining engagement surface 75, so as to allow the metallic transmission base 70 drives the output member 90 to move in synchronization therewith and increase an area of resistance between the metallic transmission base 70 and the output member 90.

In this way, the plastic mounting base 60 uses the rollers 65 to be selectively tightened to the metallic transmission base 70 in a one-way manner, allowing the input member 80 to develop an effect of one-way driving relative to the output member 90 by means of the one-way bearing 50, and a structure of one-way bearing that is lightweight and not easy to damage is constructed.

Operation of the structure of one-way bearing according to the present invention will be discussed with reference to FIGS. 5 and 6. When the input member 80 rotates in a direction opposite to the driving side (such as stationary or clockwise), the rollers 65 of the plastic mounting base 60 of the one-way bearing 50 are correspondingly located at the deep trough portions 72 of the transmission slopes 71 of the metallic transmission base 70, so that the plastic mounting base 60 cannot drive the metallic transmission base 70 through the rollers 65, and therefore, a state of free rotation is established between the input member 80 and the output member 90.

When the input member 80 rotates in a direction toward the driving side (such as counterclockwise), the rollers 65 of the plastic mounting base 60 are driven to move in synchronization therewith, so that the rollers 65 are moved to the shallow trough portions 73 of the transmission slopes 71 of the metallic transmission base 70, making the input member 80 and the transmission slopes 71 of the metallic transmission base 70 tightly clamp the rollers 65 therebetween, and therefore, the input member 80 is allowed to drive, in a one-way manner, the output member 90 to move through the one-way bearing 50.

With the previous arrangement and description, the structure of one-way bearing according to the present invention includes the plastic mounting base 60 that is molded to form a plurality of equidistant and radially-penetrating mounting recesses 61, and the mounting recesses 61 respectively receive the rollers 65 to dispose therein. Further, the surface of the circumference of the metallic transmission base 70 that corresponds to the plastic mounting base 60 is formed with a plurality of transmission slopes 71 respectively corresponding to the mounting recesses 61, so that the rollers 65 arranged on the plastic mounting base 60 may utilize the oppositely arranged metallic transmission base 70 to induce an effect of one-way driving and, in addition, the plastic mounting base 60 being made of plastics may help reduce the weight, and the metallic transmission base 70 includes the first retaining engagement surface 75 that can help increase the area of resistance strength, making it hard to fracture or break, thereby effectively extending the life span thereof, and achieving the purpose of weight reduction without affecting the strength for power transmission, and can further possess advantages of easy machining and cost reduction to significantly improve the utilization thereof.

We claim:

1. A structure of a one-way bearing, which is applicable between an input member and an output member to allow the input member to selectively drive the output member to move, in a one-way manner, toward a driving side, the one-way bearing comprising:

a plastic mounting base, which is made through molding a plastic material, the plastic mounting base comprising a plurality of equidistant and radially-penetrating mounting recesses, wherein the mounting recesses each receive therein a roller, and the mounting recesses are each provided with an elastic element at one side of the respective roller that is opposite to a driving side, wherein each of the mounting recesses of the plastic mounting base has two opposite inside surfaces and one inside surface of the two opposite inside surfaces of each of the mounting recesses of the plastic mounting base that corresponds to a non-clamping-operation side of the respective roller is formed with a stepped notch recessed in an axial direction to receive the elastic element therein, the input member being arranged at one side of the plastic mounting base, the input member being settable in contact engagement with and driving the rollers in the plastic mounting base, wherein one side of the two opposite inside surfaces of the mounting recesses of the plastic mounting base that corresponds to the metallic transmission base is formed with a first retention curved surface; and a metallic transmission base, which is made of a metal material possessing resistance, the metallic transmission base being arranged at one side of the plastic mounting base that is opposite to the input member, a surface of the metallic transmission base that corresponds to the plastic mounting base being formed, along a circumference thereof, with a plurality of transmission slopes respectively corresponding to the mounting recesses, the transmission slope having two ends, of which one end that is opposite to the driving side is formed with a deep trough portion and one end that corresponds to the driving side is formed with a shallow trough portion, wherein a second retention curved surface is formed between the shallow trough portion and the deep trough portion of adjacent ones of the transmission slopes of the metallic transmission base to correspond to the first retention curved surface of the plastic mounting base for combining and positioning the metallic transmission base and the plastic mounting base.

2. The structure of the one-way bearing according to claim 1, wherein the metallic transmission base is arranged on an outer circumference of the plastic mounting base and the input member is arranged on an inner circumference of the plastic mounting base, and the output member is arranged on an outer circumference of the metallic transmission base.

3. The structure of the one-way bearing according to claim 1, wherein each of the two opposite inside surfaces of each of the mounting recesses of the plastic mounting base is formed with a concave arc surface corresponding to a circumference of the respective roller to increase an operation space for the roller.

4. The structure of the one-way bearing according to claim 1, wherein a circumference of the metallic transmission base that corresponds to the output member is formed with at least one first retaining engagement surface, and a corresponding circumference of the output member is formed with a second retaining engagement surface corresponding to the first retaining engagement surface in order to increase an arear of resistance between the metallic transmission base and the output member.

* * * * *